Nov. 5, 1968     W. E. RAJAKARUNA     3,408,667

BED COVER

Filed Dec. 9, 1966     6 Sheets-Sheet 1

INVENTOR:
WIJEMUNI ETON RAJAKARUNA

By E. M. Squire

HIS ATTY.

Nov. 5, 1968 W. E. RAJAKARUNA 3,408,667
BED COVER
Filed Dec. 9, 1966 6 Sheets-Sheet 3

INVENTOR:
WIJEMUNI ETON RAJAKARUNA
by E.M. Squire
HIS ATTY.

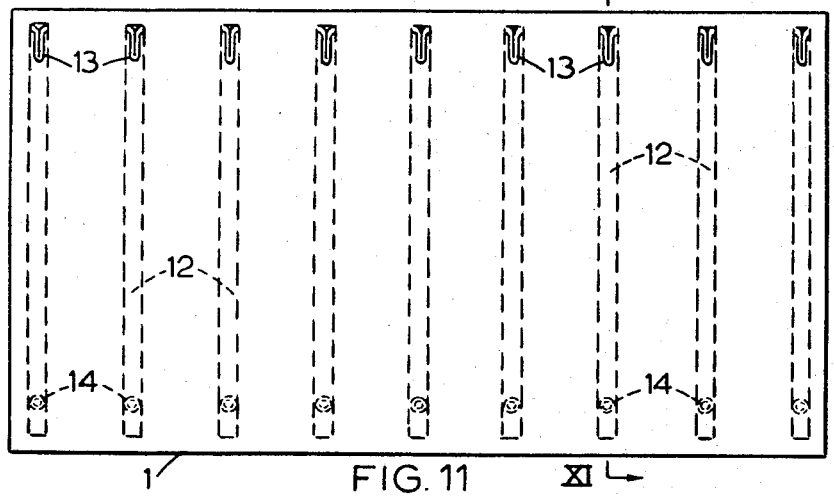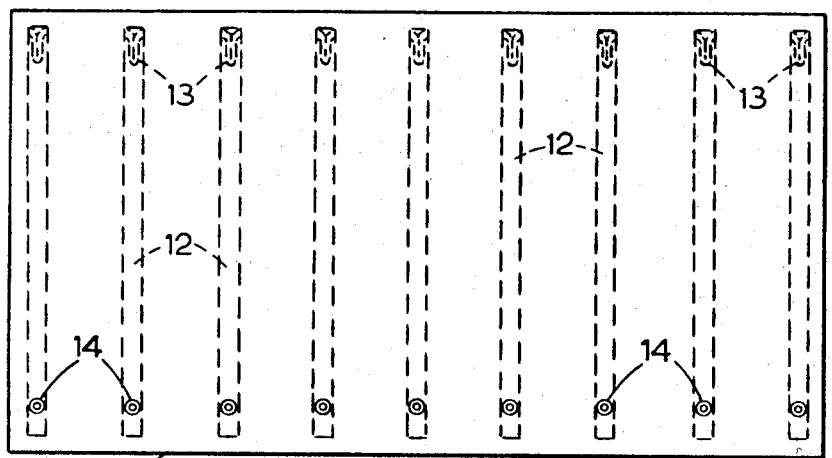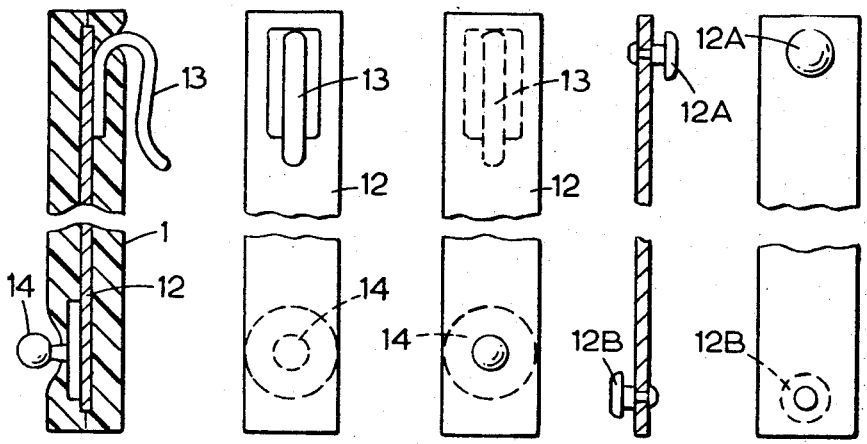

Nov. 5, 1968 W. E. RAJAKARUNA 3,408,667
BED COVER

Filed Dec. 9, 1966 6 Sheets-Sheet 6

INVENTOR:
WIJIMUNI ETON RAJAKARUNA
By E. M. Squire
His Att'y.

United States Patent Office 3,408,667
Patented Nov. 5, 1968

3,408,667
BED COVER
Wijemuni Eton Rajakaruna, 52 Bathurst St., Porter St., Hull, Yorkshire, England
Filed Dec. 9, 1966, Ser. No. 600,567
11 Claims. (Cl. 5—334)

This invention relates to bed covers and has for its primary object to provide a covering for a bed for use in place of conventional bed clothes such as blankets and eiderdowns for warmth and comfort of a person resting or sleeping on the bed.

A particular object of the invention is to provide a bed cover in which the covers do not rest on the bed occupant as is usual with blankets and such like, so providing warmth without weight.

To these ends the bed cover according to the present invention comprises two normally flat side-pieces incorporating flat spring strips, a top-piece adapted to be connected adjacent its side edges to one edge of each side-piece in their curved operative position with one edge under the bed mattress, and a foot end-piece connected to one end of the top-piece and shaped and provided with a marginal portion to take over the ends of the side-pieces in their operative position; at least the side-pieces and top-piece incorporating thermal insulating material.

The side-pieces are located partly under the mattress of a bed, and then they are curved upwardly against the flattening action of their springs and their free edges connected to the opposite sides of the top-piece with the side edges thereof overlapping the side-pieces. The foot end-piece is connected to that end of the top-piece with its marginal portion extending over the ends of the side-pieces and also under the end of the mattress. The top-piece is now located spaced from the mattress i.e. there is thus clearance between the undersurface of the top-piece and the upper surface of the mattress forming a space to receive the body of a person.

There may also be provided an elongated head end-piece adapted to be connected centrally at one side edge to the head end of the top-piece. Such end-piece is intended to wrap round the shoulders of a sleeper or tuck around the body of a person sitting up in bed to close off the otherwise open end of the body receiving space or pocket formed by the covering.

Under normal conditions the weight of the mattress will be sufficient to retain the covering side-pieces in position on the bed but provision may be made for interconnecting the edges of the side-pieces underneath the mattress. Such means may comprise for example tapes and such like elongated members separably attachable to the side-pieces as by means of separable fasteners such as hooks and eyes, snap fasteners and such like.

The side-pieces when placed partly under a mattress on a bed, with or without interconnection below such mattress as mentioned above, extend out substantially flat on opposite sides of the bed which might make it difficult to lay a sheet on the mattress and therefore there may be provided elastic elongated members separably connectable to the edges of the side-pieces to hold them in an intermediate curved position against the flattening action of their springs when not connected to the top-piece.

The connection of the side-pieces to the top-piece is preferably by means of hooks on the former engaging eyes provided on the latter, when it is further preferred that each hook is fast with and adjacent the end of a flat spring strip of the side-pieces and the eyes of the top-piece are at opposite ends of tapes or the like which are stitched lengthwise thereof to the top-piece in parallel. The elastic strips referred to in the preceding paragraph may have eyes at their ends for engaging with hooks of the side-pieces without affecting the engagement of such hooks with the eyes of the top-piece, and when so engaged the elastic strips contract to lie flat against the underside of the top-piece.

The connection of the foot end-piece and head end-piece to the top-piece is preferably by like means such as snap fasteners and the arrangement may be such that a row of like portions of complementary fasteners is provided at each end of the top-piece and a separate foot end-piece and head end-piece are each provided with an appropriately positioned row of the other portions of such fasteners for connecting such pieces to the top-piece.

The marginal portion of the foot end-piece may be elasticated and preferably at least where the same overlaps in use the side-pieces is elasticated along its free edge.

The side-pieces and the top-piece is each composed of foam plastics material, wadding, kapok or other light-weight thermal insulating material contained in a covering of fabric material.

In order that the invention may be clearly understood and readily carried into effect an embodiment thereof is by way of example herein more fully described and illustrated in the accompanying drawings, in which:

FIG. 1 is a side elevation of a bed with the new covering thereon,

FIG. 2 is a view similar to FIG. 3 with the covering side-pieces unconnected to the top-piece, the foot end-piece not being shown in this view, FIG. 3 is an end elevation as seen from the right hand side of FIG. 1, FIG. 4 is a plan view of a bed with the covering side-pieces in position partly under the mattress thereof and showing the foot end-piece in perspective, FIG. 5 is an under plan view of the covering top-piece, FIGS. 6 and 7 are side and end elevations of such top-piece, FIG. 8 is a section through the top-piece taken on the line X—X of FIG. 5, FIG. 9 is a plan view of the top-piece, FIG. 10 is a view of the tapes or the like with hooks at the ends thereof which are attached to the top-piece, FIGS. 11 and 12 are views of opposite surfaces of a side-piece.

FIG. 13 is a section on the line XI—XI of FIG. 11,

FIGS. 14 and 15 are views of opposite surfaces of a spring strip,

FIGS. 16 and 17 are sectional and surface views of a spring strip with alternative attachment means at the ends thereof.

Figure 20:
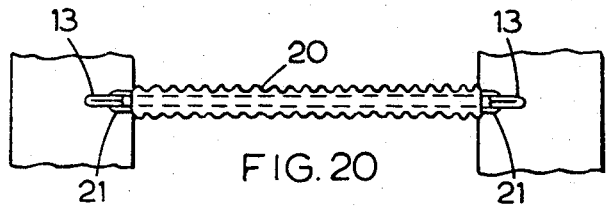
Figure 21:
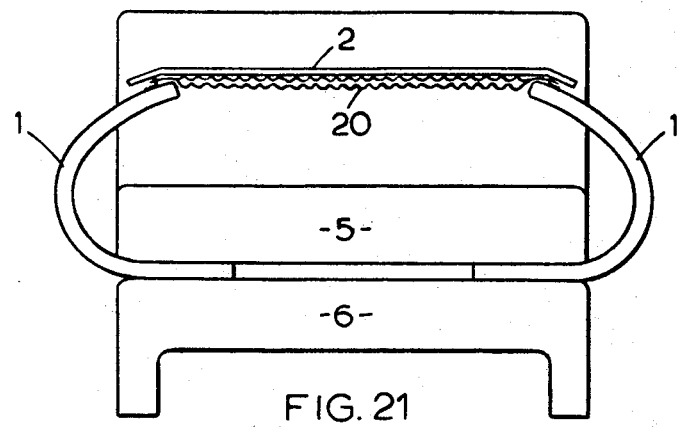
Figure 22:
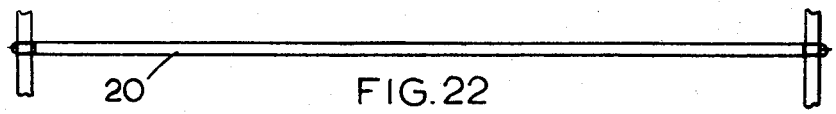
Figure 23:
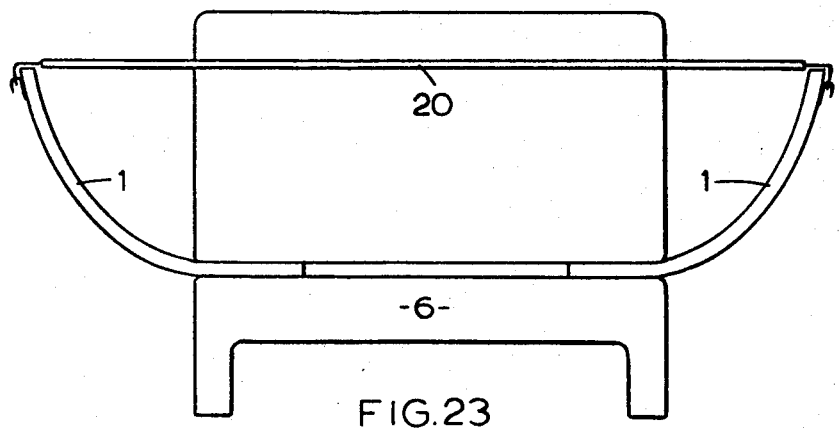

FIGS. 20 and 21 are plan and elevation views of an elastic interconnection between the side-pieces in the use position of the latter, and FIGS. 22 and 23 are views similar to FIGS. 20 and 21 showing such elastic interconnection in stretched condition as when a top-piece has been disconnected from the two side-pieces.

Figure 1:
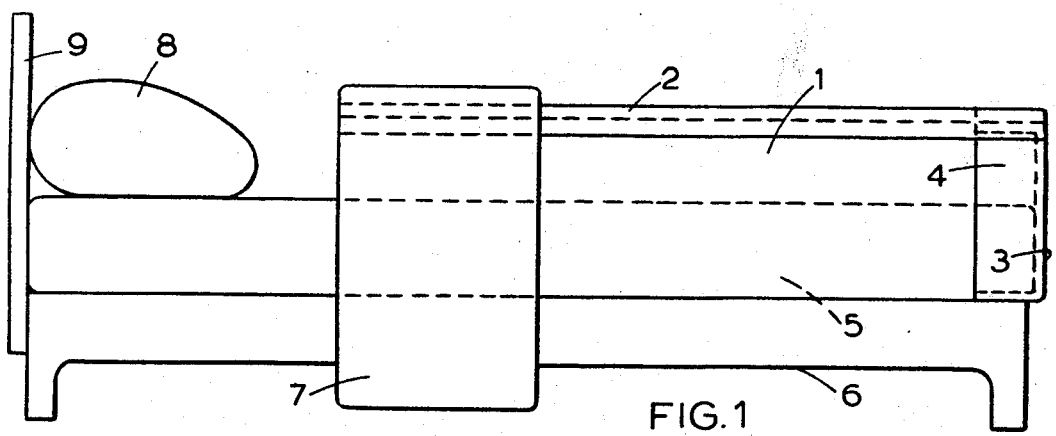
Figure 2:
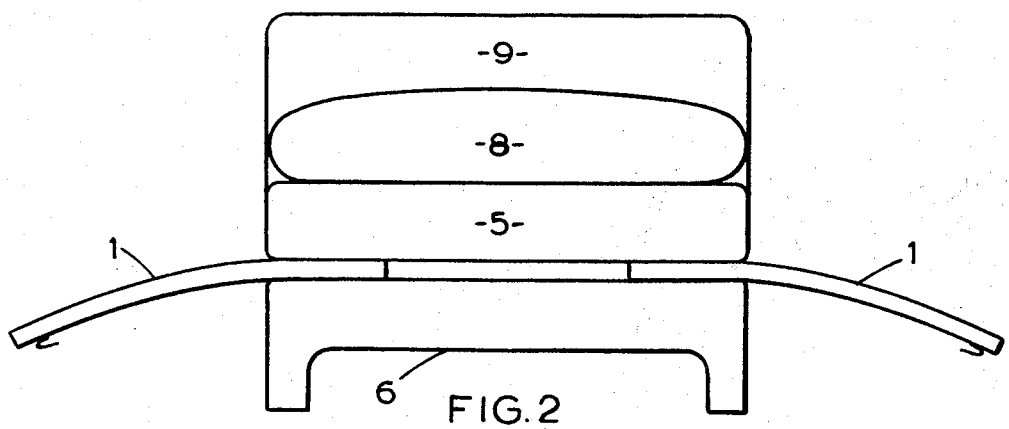
Figure 3:
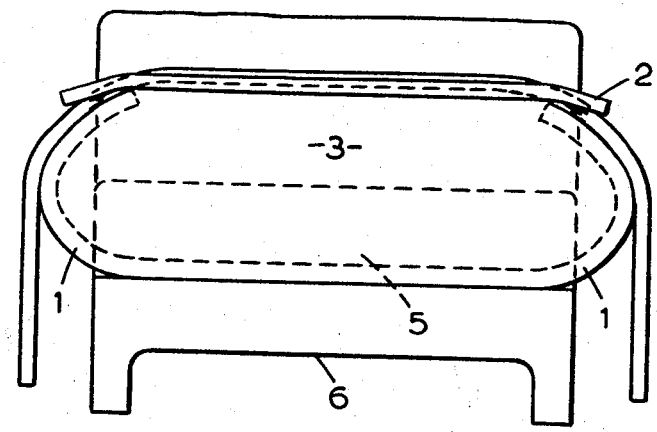
Figure 4:
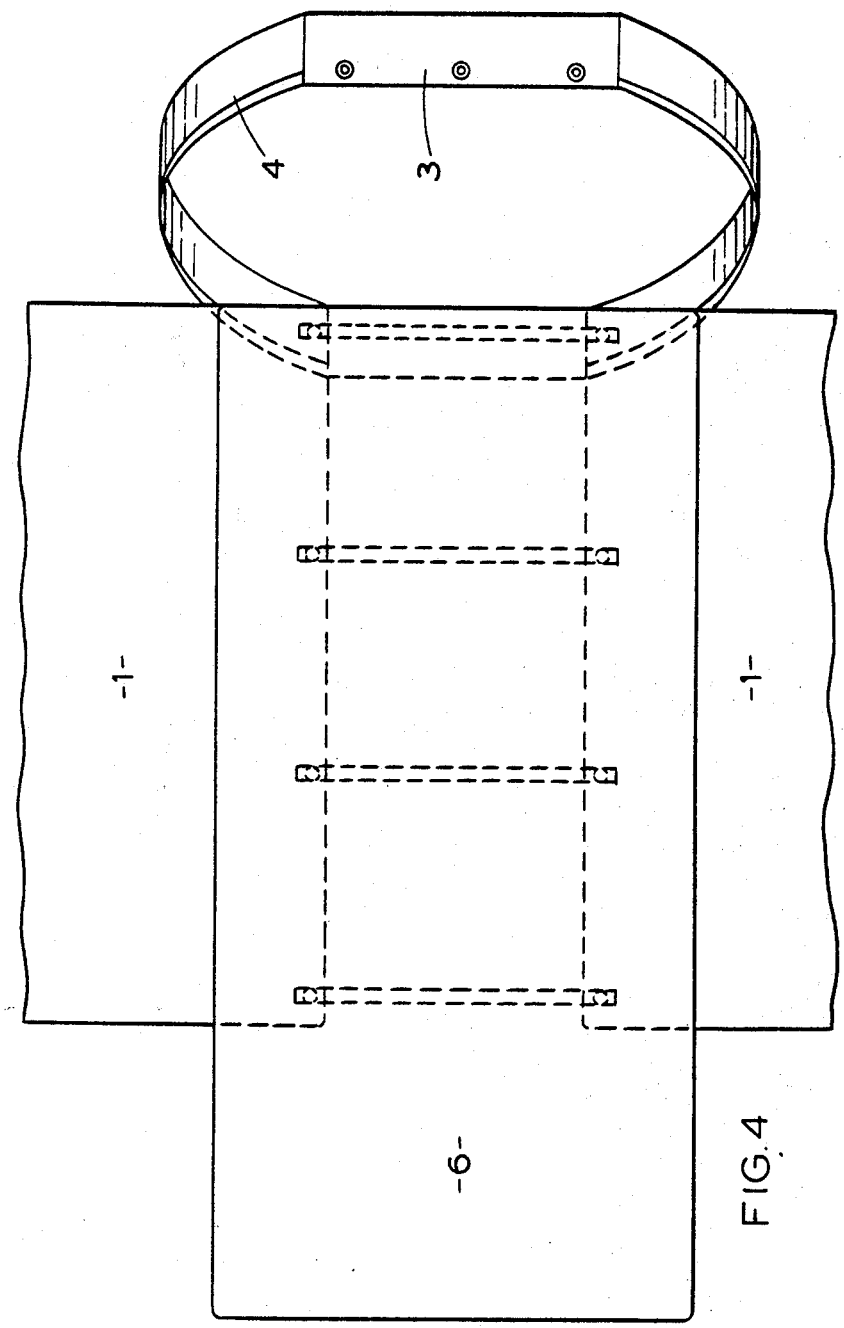
Figures 5, 7:
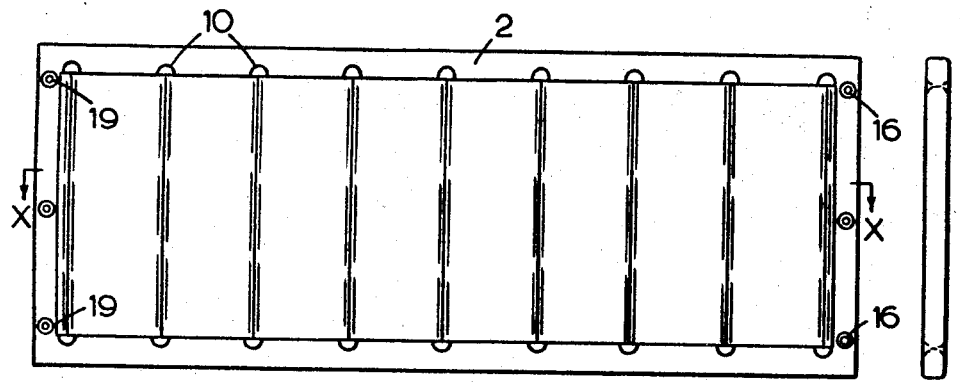
Figure 6:
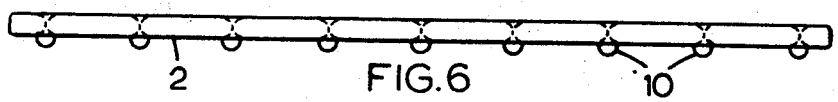
Figure 8:
Figure 9:
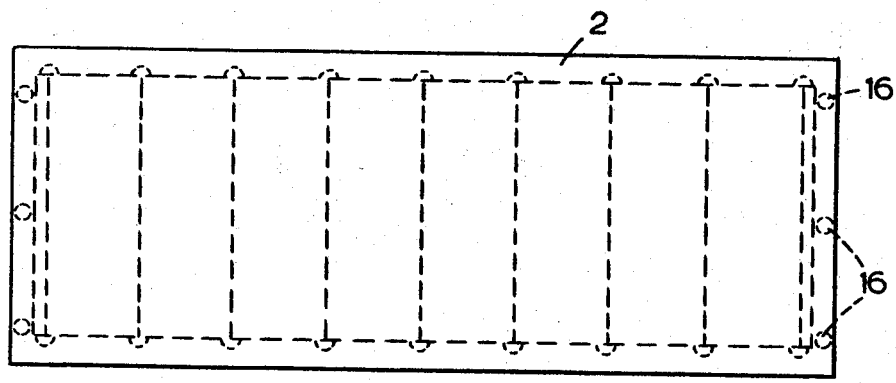

Referring now to the said drawings, the bed covering comprises substantially as illustrated in FIGS. 1 to 3 two side-pieces 1, of rectangular shape and like construction as more fully described hereafter with reference to FIGS. 11 to 17, incorporating a plurality of elongated flat spring strips 2 in parallel relationship to tend to assume a normally flat condition, a rectangular shape top-piece 2 hereafter more fully described with reference to FIGS. 5 to 9 which in operative position is connected to one edge of each of the side-pieces 1, and a substantially elliptical shape foot end-piece 3 connected to the end of the top-piece 2 and having a marginal portion 4 which overlaps the ends of the side-pieces 1 when in use position. The two side-pieces are tucked partly under the mattress 5 of a bed 6 (see FIGS. 3 and 4) and are then curved upwardly to operative position (FIGS. 1 and 2) and their edges connected to the opposite sides of the top-piece 2 so that the undersurface of the top-piece is spaced from the upper surface of the mattress 5. The foot end-piece 3 closes off the space so formed with part of its marginal portion under the mattress, part connected to the top-piece 2 and other parts taking over the side-pieces 1. There is also provided a head end-piece 7 of elongated form centrally at one side edge connected to the end of the top-piece 2 so that it may be folded back as in FIG. 1 or otherwise wrapped around a sleeper's shoulders with his body in the space referred to and his head resting on a pillow 8 kept in place by the bed head-board 9.

Figure 10:
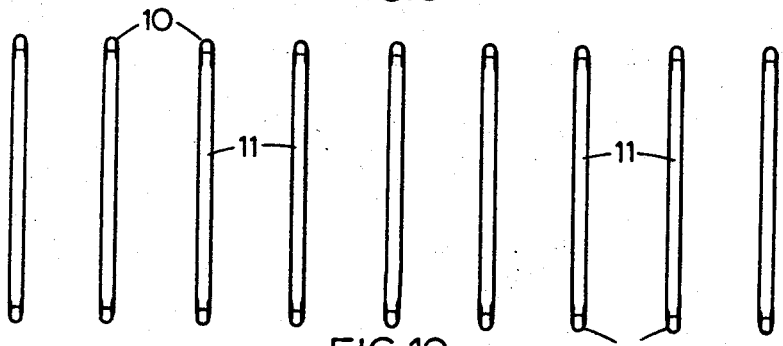

The top-piece 2 (see FIGS. 5 and 9) is of elongated rectangular shape and is composed of foam plastics material, wadding, kapok or other light weight thermal insulating material with an outer cover of fabric material. Cord, metal or plastic eyes, loops or rings 10 are provided at both ends of a tape or like strip 11 (see FIG. 10) and a plurality of such strips in parallel location are stitched lengthwise thereof to the underside of the piece 2 conveniently by through-going stitches to obtain a quilted effect (see FIG. 8). As illustrated there are nine such tapes 11 with their eyes 10 somewhat inset from the side edges of the top-piece.

The two side-pieces 1 illustrated in FIGS. 11 and 12 are similarly of elongated rectangular shape and the same length as the top-piece 2 being also similarly composed of thermal insulating material in like fabric covering. Each side 1 incorporates a plurality (nine as illustrated) of elongated flat spring strips 12 in parallel relationship and effective to tend to urge the side-piece 1 into its normally flat condition. At one end each strip 12 has a hook 13 which projects through the surface substantially as shown. At its other end each strip 12 may have a stud portion 14 of a snap fastener similarly projecting through the surface. Such tends 14 may engage complementary socket portions of such snap fastener provided on the underside of the mattress 5 and/or at the ends of strips or tapes 15 (see FIG. 4) located underneath the mattress to prevent inadvertent pulling out of the tucked under portions of the side-pieces 1. The hooks 13 engage with the eyes 10 of the top-piece 2 to retain the side-pieces 1 in their use position.

Alternatively as shown in FIGS. 16 and 17 the ends of the spring strips 12 may have oppositely extending studs 12A and 12B likewise projecting through the surfaces of the side-pieces 1 of which those numbered 12A may engage the eyes 10 of the top-piece 2 and those numbered 12B complementary fastener portions on the underside of the mattress 5 or at the ends of the strips 15.

Figure 18:
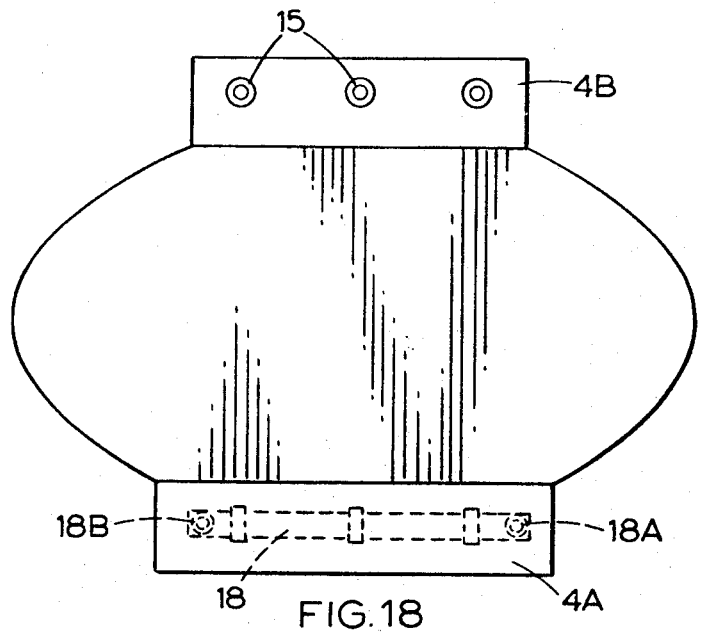
FIG. 18 is a view looking into a foot end-piece.
Figure 19:
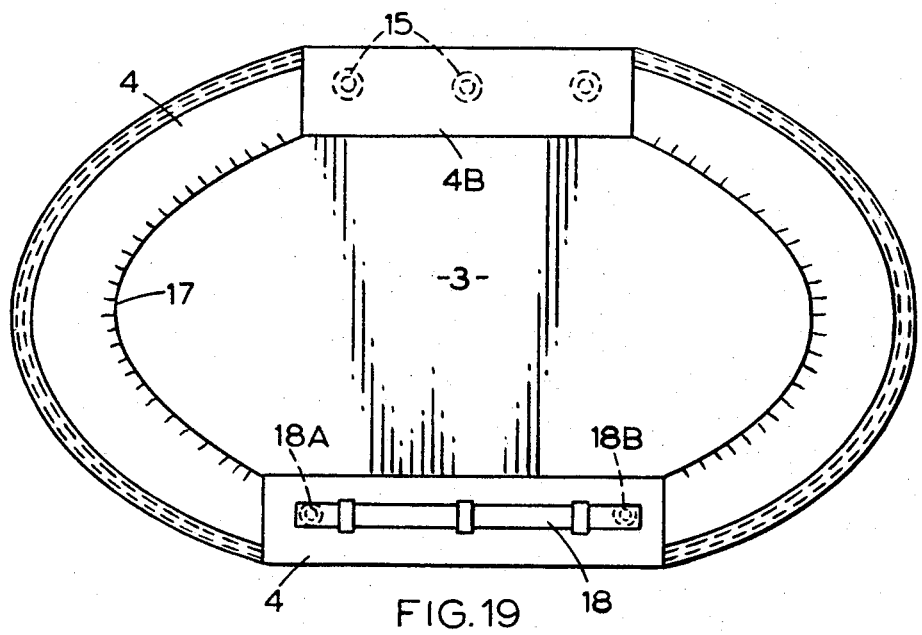
FIG. 19 is a sectional view showing the foot end-piece in operative position.

The foot end-piece 3 is likewise of thermal insulating material with a like fabric material covering and of a shape matching the sectional shape of the space defined by the two side-pieces 1 and the top-piece 2 in use position. The marginal portion 4 (see FIG. 19) extends at right angles to the plane of this piece and has a bottom portion 4A intended to tuck under the end of the mattress 5, an upper portion 4B provided with parts 15 of snap fasteners the complementary parts 16 of which are provided on the underside at the end of the top-piece 2. The portions of the margin between the portions 4A and 4B are elasticated at least along their free edges as indicated at 17 (see FIGS. 4 and 18) to grip the side-pieces the ends of which they overlap in use. The marginal portion 4A may have a retained strip 18 having at its ends fastener portions 18A and 18B to replace the end one of the strips 15 and serve also to keep the marginal portion in place.

The head end-piece 7 is also of elongated rectangular shape and of fabric material with or without an interleave of thermal insulating material and along the central portion of one side edge is provided with a plurality of members (three shown) of fasteners the other members 19 of which are provided adjacent an end of the top-piece 2.

It will be appreciated that various modifications may be made without departing from the invention and that additions may also be made thereto for example if the position of the side-pieces when unconnected to the top-pieces (as in FIG. 3) may incommode the laying of a sheet on the mattress 5, elastic strips 20 with eyes 21 at their ends may be provided (FIGS. 20–23) and connected to some of the hooks 13 so that normally such strips 20 in contracted condition will lie adjacent the undersurface of the top-piece 2 but when such piece is disconnected will in expanded condition hold the side-pieces 1 in an intermediate position (FIGS. 22 and 23) permitting access to the mattress.

I claim:
1. A bed cover for a bed with a mattress thereon, including two fabric side-pieces incorporating elastic means to tend to urge them to flat shape, one side of each of said side-pieces underlying said mattress in operative position, a fabric top-piece, means for connecting one side of each of said two side-pieces to opposite sides of said top-piece on curving said side-pieces to hold said top-piece spaced from said mattress, and a fabric end-piece with an edge flange portion to overlap at least the adjacent ends of said pieces in operative position.

2. A bed cover as claimed in claim 1, including means for holding the sides of said side-pieces underyling said mattress in spaced relation.

3. A bed cover as claimed in claim 2, wherein said means comprise tapes.

4. A bed cover as claimed in claim 1, including elastic means extending between the sides of said side-pieces connectable to said top-piece to restrict said side-pieces against flattening due to the action of the means tending to urge them to flat shape when the sides of said side-pieces are disconnected from said top-piece.

5. A bed cover as claimed in claim 1, wherein said elastic means comprise a plurality of flat spring strips in parallel relationship.

6. A bed cover as claimed in claim 5, wherein said connecting means of said side-pieces comprise hook means one at one end of each of said spring strips, said hook means engaging each with a co-operating part provided adjacent the respective sides of said top-piece.

7. A bed cover as claimed in claim 1, wherein said top-piece and said side-pieces have thermal insulating properties.

8. A bed cover as claimed in claim 1, including a fabric head end-piece which is longer than the width of said top-piece and means connecting an edge of said head end-piece to the head end of said top-piece.

9. A bed cover as claimed in claim 1 wherein the end-piece is connected to the end of said top-piece and its edge flange takes over the ends of said side-piece and of said mattress.

10. A bed cover as claimed in claim 1, wherein said top-piece and said two side-pieces are composed of foam plastics material, wadding, kapok and such like lightweight thermal insulating material.

11. A bed cover for a bed having a mattress thereon including a rectangular shape top-piece having first and second sides and head and foot ends, two rectangular side-pieces each containing a plurality of flat spring strips in parallel relationship and having first and second sides and head and foot ends, connecting means adjacent said first and second sides of said top-piece, co-operating connecting means along said first sides of each of said side-pieces, and a substantially elliptical shape end-piece having a marginal portion to overlap said foot ends of said side-pieces and foot end of said mattress when said connecting means engage said co-operating connecting means and said second sides of said side-pieces are under said mattress, and means for connecting said end-piece to said foot end of said top-piece; said top-piece and said side-pieces incorporating thermal insulating material.

References Cited

UNITED STATES PATENTS 1,742,064  12/1929  Dinstuhl _____ 5—320

BOBBY R. GAY, *Primary Examiner.*

ANDREW M. CALVERT, *Assistant Examiner.*